United States Patent
Espinosa Sánchez et al.

(10) Patent No.: US 11,591,104 B2
(45) Date of Patent: Feb. 28, 2023

(54) TANKER AIRCRAFT COMPRISING A REFERENCING SYSTEM

(71) Applicant: AIRBUS DEFENCE AND SPACE, S.A.U., Madrid (ES)

(72) Inventors: Martin Espinosa Sánchez, Madrid (ES); Javier Valdeolmos Traba, Madrid (ES)

(73) Assignee: AIRBUS DEFENCE AND SPACE, S.A.U., Madrid (ES)

( * ) Notice: Subject to any disclaimer, the term of this patent is extended or adjusted under 35 U.S.C. 154(b) by 228 days.

(21) Appl. No.: 17/078,584

(22) Filed: Oct. 23, 2020

(65) Prior Publication Data

US 2021/0122486 A1    Apr. 29, 2021

(30) Foreign Application Priority Data

Oct. 23, 2019  (EP) .................................. 19382923

(51) Int. Cl.
  *B64D 39/00*    (2006.01)
  *B64D 47/02*    (2006.01)

(52) U.S. Cl.
  CPC ............. *B64D 39/00* (2013.01); *B64D 47/02* (2013.01)

(58) Field of Classification Search
  CPC ................................. B64D 39/00; B64D 47/02
  See application file for complete search history.

(56) References Cited

U.S. PATENT DOCUMENTS

| | | | |
|---|---|---|---|
| 4,158,885 A | 6/1979 | Neuberger | |
| 4,170,767 A * | 10/1979 | Tanner | G08G 5/025 362/543 |
| 2005/0269455 A1* | 12/2005 | Hewitt | B64D 47/02 244/135 A |
| 2014/0358335 A1* | 12/2014 | Sanchez Ruiz | B64D 39/00 701/14 |
| 2018/0281986 A1* | 10/2018 | Chang | B64D 47/02 |

FOREIGN PATENT DOCUMENTS

| | | |
|---|---|---|
| EP | 2 808 260 | 12/2014 |
| GB | 1 449 522 | 9/1976 |
| WO | 2005/044663 | 5/2005 |

OTHER PUBLICATIONS

Extended Search Report for EP19382923.1, dated Apr. 14, 2020, 7 pages.
Wikipedia (Optical Landing System)(Jan. 2014)(six pages).

* cited by examiner

*Primary Examiner* — Richard Green
*Assistant Examiner* — Ashesh Dangol
(74) *Attorney, Agent, or Firm* — Nixon & Vanderhye P.C.

(57) ABSTRACT

A referencing system to assist a receiver aircraft in relative positioning during in-flight refueling operation that includes an array of references congregated on a spot of the tanker aircraft, wherein the array of references provide a distinguishable visual indicator depending on the sector where the receiver aircraft positions.

14 Claims, 5 Drawing Sheets

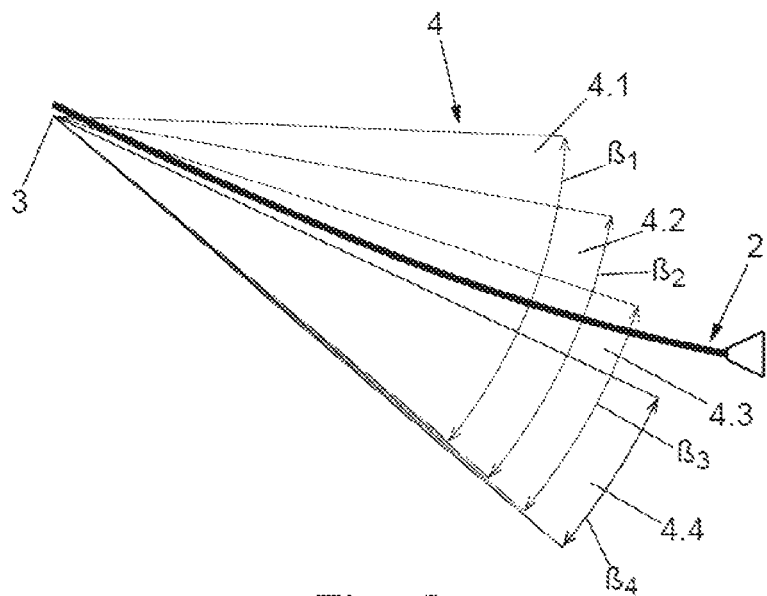
Fig. 2
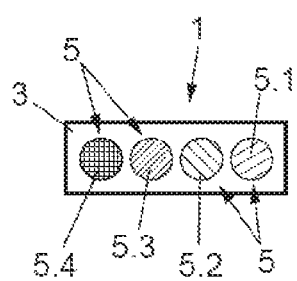 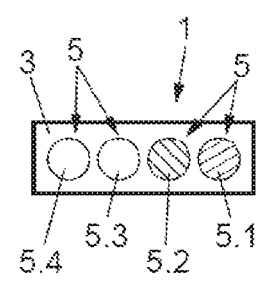 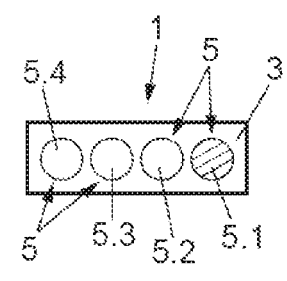
Fig. 3a    Fig. 3b    Fig. 3c

TANKER AIRCRAFT COMPRISING A REFERENCING SYSTEM

RELATED APPLICATION

This application claims priority to European Patent Application EP19382923.1, filed Oct. 23, 2019, the entirety of which is incorporated by reference.

TECHNICAL FIELD

The present invention belongs to the field of aerial or air-to-air refueling operations ("in-flight refueling"), and particularly relates to a referencing system for assisting a receiver aircraft in relative positioning with a tanker aircraft during in-flight refueling operation.

BACKGROUND

In refueling operations, a tanker aircraft stores fuel which, via a hose and drogue system, is transferred in-flight to another aircraft—the receiver—which receives it through its probe.

Hose and drogue refueling systems generally comprise a drum configured to wind/unwind the hose during the refueling operation. This drum is normally further equipped with a fuel pipe connected to a fuel line in connection with a fuel tank, in order to allow this fuel to pass through.

Furthermore, a coupling and a drogue are installed at the end of such hose. The coupling has the function of connecting with the receiver aircraft probe and includes a valve for the fuel system. The drogue has the function of generating the aerodynamic drag necessary to trail and stabilize the hose and to hold the coupling as the receiver pushes forward on the coupling to connect with the tanker.

Different drogues can be used depending on the application, within the typical airspeed range 105-325 knots, i.e. around 195-602 km/h. In any scenario, these drogues provide a drag force up to typically 600 pounds-force (lbf), i.e. about 2.7 kilo-Newtons (kN).

During aerial refueling, for safety reasons, special attention should be drawn to keep a correct relative position between the tanker and receiver aircraft. Correct relative positioning assists in avoiding collisions between the aircraft. Also, correct relative positioning between the aircraft reduces risks of a collision between the hose and the receiver aircraft especially during hose deployment from the tanker towards the receiver aircraft and during disconnection of the hose from the receiver.

Conventionally, two solutions have been typically applied to keep a correct relative position between receiver and tanker aircraft. The first solution is to add marks on the hose which marks are used to estimate the deployed length of the hose and estimate the distance between aircraft. The second solution is a device fitted around the hose tunnel outlet that gives discrete indications of the hose deployed length.

During probe contact with the hose and drogue system, normally only longitudinal indications (based on hose length) are measured. Lateral and vertical relative distances are estimated by receiver aircraft pilot by using visual references on the tanker aircraft.

The pilot of the receiver aircraft is responsible for maintain a correct separation between tanker and receiver aircraft. The receiver pilot normally takes visual clues of the separate by using visual references on any part of the tanker, such as the horizontal stabilizer or the wing of the tanker. The effectiveness of these visual references on the tanker aircraft depends on where the fuel receiving probe on the receiver aircraft is located with respect to the receiver pilot's field of view. The ability of a receiver pilot to use a visual reference on a tanker aircraft may be influenced by whether the fuel receiving probe is above or below the pilot's field of vision, and the relative position of the receiving probe to the tanker along the receiver pilot's line of sight.

Using conventional measurements of deployed hose length and visual references on the tanker provides sufficient references for the receiver pilot as the receiver approaches the tanker and connects to the hose coupling. However, when the receiver disconnects from the hose coupling, the end of the hose switches from being under tension and captured by the receiver to being free of tension and freely moving in the airspace. This switch creates a risk that as the tension in the hose is released and the end of the hose freely moves, the hose collides with the receiver aircraft. The relative position between the receiver aircraft and the hose and the tanker is thus most critical during the hose disconnection phase.

The drogue may hit the receiver aircraft if the relative position of the receiver with respect to the tanker with the hose and drogue system is far from the nominal position. The nominal position is defined as that position of the hose and drogue system in which there is a force equilibrium in free flying, accounting inter alia for weight (dependent on hose length), hose tension, drogue drag (dependent on tanker speed), and possibly other aerodynamic parameters.

A proper relative position between a receiver helicopter and a tanker has special importance because the receiving probe on the helicopter is typically below the rotor blades of the helicopter. During release from a helicopter receiving probe, there is a risk that the release of tension in the hose could allow the hose to swing into the rotor blades if the relative position is incorrect between the helicopter and tanker.

SUMMARY

There is a long felt need for a referencing system mountable to a tanker than can be reliably used by a pilot of a receiver aircraft to establish a correct relative position between the receiver and tanker aircraft. The present invention may be embodied as a solution for the aforementioned problems. The present invention may be embodied as a referencing system on a tanker aircraft that is used by a receiver aircraft when approaching the tanker aircraft.

The referencing system may be adjusted to account for in-flight parameters of the tanker aircraft as well as refueling operation parameters. Because these parameters are typically known prior to flight of the tanker aircraft, the referencing system may be adjusted to take the parameters into account while the tanker aircraft is on the ground. By making the adjustments on the ground, the referencing system may be used as a passive system in-flight system which reduces the certification procedures for the referencing system that are performed in flight.

The present invention provides a referencing system on a tanker aircraft that provides visible references for a pilot of a receiver aircraft to position the receiver aircraft especially during disconnection of the receiver aircraft from the hose-drogue of the tanker. Using the referencing system, the pilot may correctly position the receiver aircraft relative to the tanker aircraft phase as the released hose-drogue return to an equilibrium state (so-called nominal position). Correct positioning of the receiver aircraft relative to the tanker aircraft reduces the risk of the hose and drogue being whipped as tension in the hose is release or due to incorrect vertical positioning of the receiver aircraft relative to the tanker aircraft.

In a first inventive aspect, the invention provides a tanker aircraft comprising a referencing system for relative positioning a receiver aircraft during in-flight refueling operation via a hose and drogue system, wherein the referencing system comprises an array of references congregated on a spot of the rear part of the tanker aircraft, such as the tail cone thereof, wherein the array of references defines a plurality of sectors originated from the spot, a sector being defined by its amplitude in angle, wherein, for each one of these sectors, the array of references is configured to provide a distinguishable visual indicator, and the array of references being adjustable with respect to: at least one flight parameter of the tanker aircraft, and at least one in-flight refueling operation parameter.

The referencing system according to an embodiment of the present invention provides a plurality of sectors in terms of 'spherical sectors' establishing regions of space. Each of these sectors is defined by two radii separated there between by its amplitude in angle (i.e. a circular sector).

Although a spherical sector may be formed, it is of special relevance for the present invention the circular sector formed, as it defines upper and lower boundaries (i.e. two radii) for vertical relative referencing.

In geometry, a sector (or circular sector) is further defined by an arc, thus establishing an area together with the radii. Nevertheless, herein, the arc may be established by the hose length during refueling as it is the relative longitudinal distance between aircrafts when coupled.

Without prejudice of the visual capacity of the pilots, the array of references are visually distinguishable by associated indicators in each one of these sectors at least up to the hose maximum length. Since the array of references may provide a distinguishable visual indicator beyond such longitudinal distance of the hose length, it is up to the receiver aircraft pilot to distinguish the visual indicators between them even at greater distances, for instance, based on his visual acuity, field of vision, twilight vision, glare, etc.

Therefore, from the spot of the tanker aircraft the plurality of sectors are defined by their amplitude in angle. Accordingly, the receiver aircraft passes through these sectors as it passes through different relative altitudes. In addition, for instance, two sectors may partially overlap thus defining a third sector as within the intermediate area (overlapping area) the array of references provides another distinguishable visual indicator which is the distinguishable visual indicators of each former two sectors at the same time.

Hence, the present invention may be embodied to create a vertical reference to the receiver aircraft, so the receiver aircraft can determine, especially at the time of disconnection, if it is above or below the nominal position.

Since this nominal position of the hose and drogue system highly depends on flight parameters, in-flight refueling operation parameter, such array of references need to be adjusted with respect to them in order to correctly establish this nominal position.

Therefore, unlike lateral (or even longitudinal) relative positioning, a fixed reference (e.g. based on visual references over disparate areas or the aircraft) cannot be used to ensure the correct vertical position.

Other parameters such as the probe location (addressed in the first inventive aspect within the in-flight refueling operation parameter) on the receiver aircraft highly influences the desired vertical positioning in regard of the nominal position of the system.

The receiver aircraft may be any flyable aircraft vehicle having a need for air-to-air refueling, such as fixed-wing aircraft; and rotary-wing aircraft such as helicopters.

The referencing system may include visual references on a spot of the rear part of the tanker aircraft, such as the tail cone, that is close to a hose outlet tunnel on the tanker. If the tanker aircraft has a cargo ramp, the spot may be on the cargo ramp at the rear of the tanker aircraft. The spot may be arranged on dedicated lateral fairings of the cargo ramp which do not interfere with the cargo ramp operation.

The at least one flight parameter of the tanker aircraft comprises: tanker aircraft speed, and/or the angle of attack of the tanker. Both parameters affect lifting forces of the tanker aircraft and, therefore, modify the surrounding air flowing behind the tanker where the drogue flies. The in-flight refueling operation parameter may also comprise the type of receiver aircraft to be refueled, the sort of drogue, and/or the length of the hose.

The adjustment accounts for the actual characteristics of the hose and drogue system, and for the actual dimension of aircraft receiver parts along with the probe location and dimension in order to avoid any collision if receiver aircraft shifts from desired (dependent on nominal position of hose and drogue system) during disconnection.

In a particular embodiment, the array of references of the referencing system comprises an array of lights with n light sources, n being a natural number (whole positive integer number) greater than or equal to 3. If n is 6, the referencing system comprises 6 light sources.

Each light source provides distinguishable visual indicators by projecting light in a sector defined by a predetermined amplitude of projection set by a projection orientation ($\alpha n$), the array of lights being adjustable at least in amplitude ($\beta\_n$) and projection orientation ($\alpha n$). Each of the lights, based on their amplitude ($\beta\_n$) (i.e. the amplitude in angle) and projection orientation ($\alpha n$), provides a light beam corresponding to a sector. Each of these light sources illuminates a particular sector which makes each sector distinguishable from the other sectors.

In an embodiment of the invention, the light sources congregated on the spot of the rear part of the tanker aircraft are arranged aligned. This stresses the fact of being distinguishable from each other.

In an embodiment wherein the tanker aircraft comprises a cargo ramp, the spot may be arranged on said cargo ramp such that the lights sources are visible when the cargo ramp is closed. At this configuration of closed ramp, there is a reduced available space for arranging such a referencing system.

As it was mentioned above regarding the sector overlapping, in a particular embodiment, the light projected by at least two of the n light sources are configured to partially overlap in the respective sectors, these at least two sources of light becoming visible at the same time only within the overlapped sectors.

Therefore, the overlap of two lights implies the generation of a new illuminated sector since light sources congregated on the spot are perceived differently (these two lights simultaneously on) by the receiver aircraft.

In a particular embodiment, the partial overlap establishes a referencing protocol for assisting the receiver aircraft with its relative positioning during the in-flight refueling operation.

This referencing protocol is based on, since the pilot of the receiver aircraft needs only to look at the spot of the tanker aircraft, the array of references therein provides a particular visual indicator able to be distinguishable depending on the sector where the receiver is positioned.

As the receiver aircraft moves up or down in relation to the nominal height of the hose and drogue system, the pilot of the receiver aircraft can see to receive information about his relative position with regard to the tanker aircraft which assist him during this refueling operation. This information is acknowledged by the pilot because, for each height that the referencing system is adjusted to, the pilot perceives the associated visual indicator differently. Knowing beforehand this referencing protocol allows the receiver aircraft pilot to work under a fail-safe protocol.

The sector overlapping features provides a fine tune of this referencing protocol emphasizing the fail-safe characteristics.

In a particular embodiment, the n light sources are at least 3 lights, each one emitting light in any of at least two color tones.

In an embodiment of the invention, at least one light source emits red light, while at least another light source emits white light. That is, the array of lights are perceived in its entirety by the receiver aircraft as if it were changing from red to white, and vice-versa, if the receiver moves downwards or upwards, respectively.

Advantageously, the light code is alike the one used in airport approach systems so pilots are accustomed to it. The color change is based on a combination of lens mounted on different angles and, therefore, it is a passive system.

In a particular embodiment, each sector has an amplitude between 2 to 4 degrees of angle, preferably between 2.5 and 3.5 degrees of an angle.

Further, in an embodiment of the invention, the projection orientation ($\alpha n$) of each light source is gradually displaced two degrees of an angle.

The configuration of this embodiment provides a preferred referencing system for helicopters.

In a particular embodiment, the array of references of the referencing system comprises an array of n marks, n being a natural number greater than or equal to 3, and a pointer device distanced from the marks, wherein each mark provides a distinguishable visual indicator in cooperation with the pointer device for a different sector in such a way that the pointer device visually intervenes a different mark on the spot for a different sector. This embodiment uses visual perspective of the receiver aircraft pilot since the pointer device visually intervenes a different mark on the spot depending on the particular sector where receiver aircraft is positioned.

Between the pointer device and the reference marks there is a predetermined longitudinal distance, so that the projection of the reference line with respect to the mark references plane changes depending on the vertical position of the receiver. The present embodiment is of special interest when the refueling operation is expected to be accomplished with the cargo ramp opened.

In a particular embodiment, the array of references are adjustable by changing the distance of the pointer device from the marks.

In an embodiment, the array of n marks on the spot are stacked horizontal lines of different color tones.

Therefore, this provides an optimum referencing system for vertical positioning.

These marks may be painted, illuminated or be lights to improve their visibility. In a preferred embodiment, the horizontal lines are either LED or Infrared red lights.

For instance, infrared (IR) lights enables the pilot of the receiver aircraft to visually determine and locate the stacked horizontal lines during night-time or low visibility conditions enhancing their situational awareness and increasing aircraft operational envelope.

Specifically, these IR lights may be only perceivable through a night-vision device such as night-vision goggles.

In a second inventive aspect, the invention provides a method for assisting on relative positioning a receiver aircraft during in-flight refueling operation of tanker aircraft according to any of the embodiments of the first inventive aspect, wherein the array of references of the tanker aircraft has been previously adjusted with respect to at least one flight parameter thereof, and at least one in-flight refueling operation parameter; herein the method comprises the following steps: deploying the hose and drogue system by the tanker aircraft during the in-flight refueling operation, and detecting by the tanker aircraft that a probe of a receiver aircraft to be refueled is coupled, saving the sector from the spot at which the coupling occurs.

That is, before the tanker aircraft takes off, it is known beforehand decisive parameters at which the refueling maneuver is desirable to take place so that both aircrafts are prepared therefor.

Because aircraft industry is highly regulated, refueling operation envelope for couples of tanker and receiver aircrafts should comply with airworthiness certified ones. Therefore, the in situ in-flight refueling conditions are tailored to the expected ones.

Advantageously, this strongly minimizes certification regulations as the referencing system according to the invention acts as a passive system already adjusted on-ground. The lack of electronics or digital involvement entails less risk exposure.

Under some circumstances, the referencing system when incorporated into a tanker aircraft according to the present invention may be understood as a non-certifiable system.

In a particular embodiment, the tanker aircraft is according to any one of the embodiments where the referencing system comprises an array of lights with n light sources, and the array of references of the tanker aircraft has been previously adjusted on-ground so that the adjustment of the distinguishable visual indicators comprises projecting light from the n sources of light in sectors, further adjusting their predetermined projection amplitude and projection orientation ($\alpha n$) based on the at least one flight parameter of the tanker aircraft during the following in-flight refueling operation, and at least one in-flight refueling operation parameter.

In a particular embodiment, the tanker aircraft comprises a referencing system based on an array of n marks, n being a natural number greater than or equal to 3, and a pointer device distanced from such marks, and the array of references of the tanker aircraft has been previously adjusted on-ground so that the adjustment of the distinguishable visual indicators comprises changing the distance of the pointer device from the marks based on the at least one flight parameter of the tanker aircraft during the following in-flight refueling operation, and at least one in-flight refueling operation parameter.

In a third inventive aspect, the invention provides a method for uncoupling the hose and drogue system of a tanker aircraft according to any one of the embodiments of the first inventive aspect from a probe of a receiver aircraft during in-flight refueling operation; wherein the referencing system defines at least 3 sectors corresponding with different altitudes of the receiver aircraft during the in-flight refueling operation, the at least 3 sectors categorized as upper, suitable, and lower sectors, respectively, and wherein at the suitable sector, the tension of the deployed hose is minimum;

wherein the method comprises: positioning the receiver aircraft within the suitable sector, and uncoupling the hose and drogue system by the tanker aircraft from the probe of the receiver aircraft.

As it was mentioned, the uncoupling phase is crucial in refueling operation because the drogue (connected to the hose) is released from the probe (further released from this joining force induced by the probe) and it may return to another position driven by the pursuit of equilibrium forces.

In other words, at the suitable sector, the hose and drogue system is at the nominal position. In this position the tension of the deployed hose is minimum since it does not need to counteract for the probe induced tension.

This suitable sector may be either a specific height relative to the tanker aircraft or a range thereof where the return of the hose may not bring into contact with parts of the receiver aircraft.

In a fourth inventive aspect, the invention provides a method for in-flight refueling operation between a tanker aircraft according to any one of the embodiments according to the first inventive aspect and a receiver aircraft, the method comprising the following steps: assisting on relative positioning a receiver aircraft during in-flight refueling operation of tanker aircraft according to any of the embodiments of the second inventive aspect; upon connecting the coupling of the drogue of the tanker aircraft to the probe of the receiver aircraft, transferring fuel therebetween; uncoupling the hose and drogue system of a tanker aircraft according to the third inventive aspect.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 2 is a schematic lateral view of the distinguishable visual indicators provided by the array of references of the present referencing system.

FIGS. 3a to 3c show the congregated array of references within the spot of a referencing system, in which can be seen gradual changes of the distinguishable visual indicators as the receiver aircraft moves up or down.

DETAILED DESCRIPTION

The person skilled in the art may recognize that aspects defined herein may be embodied as a referencing system or as a method steps.

Figure 1:
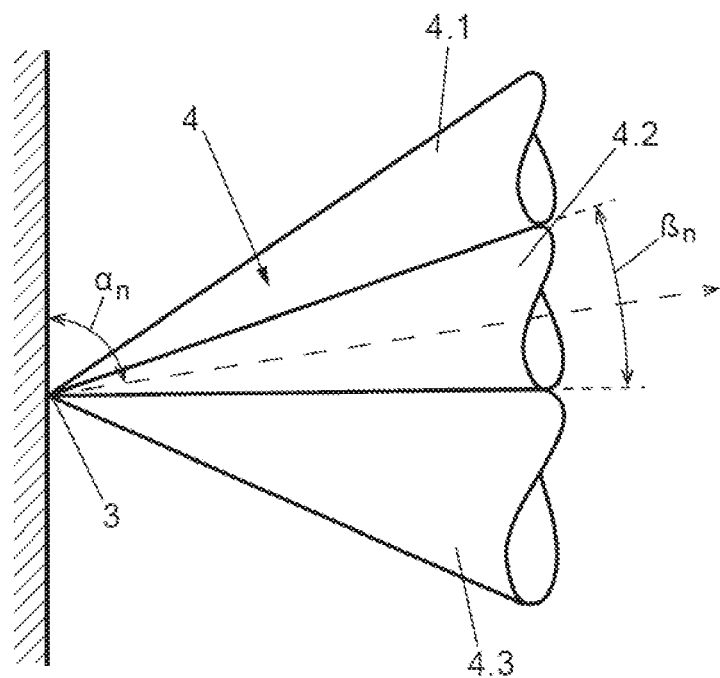
FIG. 1 is a schematic depiction of a plurality of sectors defined from a referencing system according to an embodiment of the present invention.

FIG. 1 depicts a schematic plurality of sectors (4) according to the present invention. The referencing system (1), through distinguishable visual indicators, is in charge of relative positioning a receiver aircraft during in-flight refueling operation.

The referencing system (1) comprises an array of references congregated on a spot (3) of the rear part of the tanker aircraft, such as the tail cone thereof. From this spot (3) the plurality of sectors (4) are originated, wherein each sector (4) is defined by its amplitude in angle ($\beta n$), and wherein for each sector (4), the array of references is configured to provide a distinguishable visual indicator. The array of references being further adjustable with respect to the at least on flight parameter of the tanker aircraft and at least one in-flight refueling operation parameter.

The referencing system (1) may be embodied to provide a simple, quantifiable and an in-flight passive system that promotes safety of in-flight refueling operation.

FIG. 1 shows three sectors (4) originated from a spot (3) of the reference system (1). Each sector (4) is a region of airspace behind the spot, such as an expanding conical region of airspace illuminated by a light source (5, FIGS. 3a-c) at the spot. Each sector (4) is a region of airspace provides a distinguishable visual indicator on the spot to be viewed by the receiver pilot in the receiver aircraft during in-flight refueling operation. In the example shown in FIGS. 3a to 3c, each sector (4) is defined by a light beam from a light source (5) mounted to the spot (3).

Further, each sector (4) is defined by its amplitude angle ($\beta n$) and the corresponding projection orientation ($\alpha n$). The amplitude angle ($\beta n$) is an angle formed by the upper and lower regions of the sector (4) using the spot (3) as an apex and source of the sector (4) The projection orientation ($\alpha n$) is an angle from vertical to a centerline of the sector. Each sector (4) can be adjusted by, for example, adjusting the light source (5) beam width (which corresponds to the amplitude ($\beta n$) angle) and the beam direction (which corresponds to the projection orientation ($\alpha n$)).

The referencing system may be adjusted, such as while the tanker is on the ground, to account for certain variable in-flight refueling operation parameters and tanker flight parameters. When the referencing system is adjusted and fixe, to for example conform to certification rules, the referencing system is tailored, e.g., adjusted, to the actual conditions of a specific in-flight refueling operation.

As it was mentioned before, this adjustment is necessary for sizing the overall referencing system from the nominal position, e.g., equilibrium forces, of the hose and drogue system in order not to abruptly shifts upon disconnection jeopardizing the integrity of the aircrafts involved in the maneuver.

Particularly, to suit the vertical displacement of the receiver aircraft during a particular refueling operation, the projection orientation ($\alpha n$) is gradually increased, such as in increments of 2 degrees of an angle. So that, in this vertical displacement, the receiver aircraft pilot shall appreciate or perceive a gradual change of the array of references only looking at the spot where they are congregated.

The amplitude in angle (βn) of each of these the sectors (4) (measured around the projection orientation (αn), that is, with the latter as a baseline), whether constant or variable through the sectors, establishes the vertical height at which that distinguishable visual indicator will be indeed appreciated during the vertical displacement.

As one skilled in the art may recognize, if the amplitude in angle (βn) is greater than a relative angle between two projection orientations (αn), the corresponding sectors will overlap at least in part.

Referring back to FIG. 1, each one of the three sectors (4) provides a distinguishable visual indicator visible to the receiver aircraft approaching the tanker aircraft. Depending on the relative position of the receiver aircraft to the tanker aircraft, the receiver aircraft with be in an airspace region defined by one of the sectors. The sectors (4) provide visual information for the receiver aircraft about if the receiver aircraft is indeed in a good region for refueling operation conditions or not.

In particular, a first sector (4.1) and a third sector (4.3) define a first region and a third region, respectively. If the receiver aircraft is in one of the first and third regions, it would not be in appropriate conditions for the refueling operation, or disconnecting the probe. In contrast, if the receiver aircraft is located in a second region defined by a second sector (4.2) then it would be in the appropriate conditions for the refueling operation, as the hose and drogue system is located close enough to the nominal position.

That is, if the receiver aircraft is positioned in the first sector (4.1) it is understood that the receiver aircraft is located above the appropriate region (second sector 4.2) for the refueling operation; and if the receiver aircraft is positioned in the third sector (4.3) it is understood that the receiver aircraft is located below said appropriate region of the second sector (4.2).

Similarly, the above and below categorized as unsuitable regions in previous example, may be equally positioned both below the suitable area. For instance, this may be the case of the receiver aircraft being an helicopter as middle region ('unsuitable') warns about over-tension of the hose but with no risk for blade impact; while disconnection within the below region may entail both hose over tension and possible collision with rotor blades due to the distance from nominal position of the hose and drogue system.

The array of references may be a referencing system based on lightening sources or a referencing system with an array of marks at which a pointer device interferes according to the following first and second embodiment, respectively.

First Embodiment

FIGS. 2 and 3a-3c show a first embodiment of a referencing system (1) wherein the array of references comprises an array of light sources (5), particularly the referencing system (1) comprises four light sources (5) as it can be observed in FIGS. 3a-3c. Each light source (5) provides a distinguishable visual indicator, such as by different color of the light source, for the receiver aircraft by projecting light in a sector (4) (shown in FIG. 2). Each sector (4) is defined by a predetermined amplitude of projection set by a projection orientation (αn), as well as by its amplitude angle (βn) according to the position of the desired receiver aircraft with respect to the tanker aircraft.

In the example shown in FIG. 2, the sectors (4.1, 4.2, 4.3, 4.4) partially overlap with adjacent ones so that, supported by the smooth transition of this the partial overlap, it is stablished a readily referring protocol for assisting the receiver aircraft with its relative positioning during in-flight refueling operation.

It is to be noted that, throughout this first embodiment, each of the sectors (4) corresponds to a light beam shape of the associated light source (5). As mentioned, overlaps of the light beams may give rise to another sector because, at that intermediate position, the pilot of the receiver aircraft shall perceive both lights on simultaneously, which is distinguishable from the pilot being able to see only one of the two lights.

By controlling their amplitude (βn) in angle and projection orientation (αn), the plurality of sectors (4) comprises a first sector (4.1) with a first amplitude (β1) and a first projection orientation (α1); a second sector (4.2) with a second amplitude (β2) and a second projection orientation (α2); a third sector (4.3) with a third amplitude (β3) and a third projection orientation (α3); and a fourth sector (4.4) with a fourth amplitude (β4) and a fourth projection orientation (α4). Furthermore, in this FIG. 2 it is shown the hose and drogue system (2) deployed along the region defined by the overlap of the first (4.1), second (4.2) and third (4.3) sectors, this region corresponding to the appropriate region for the refueling operation between the tanker aircraft and the receiver aircraft.

Additionally, a third variable for tuning-up the light sources (5) may be the light intensity, as it may be dimmed as it is close to the tanker aircraft (see, for instance, sector 4.1). For those risky sectors, the intensity may be higher to account for the over length of the hose (possibly implying over tension) which may cause whipping upon disconnection. In other words, as the receiver aircraft goes away from the tanker aircraft, entailing a hose extension while connected, the light intensity should be high enough so as to warn the pilot about the unsuitability of that sector far away from the nominal position.

Still in FIG. 2, these light sources (5) are projected from a spot (3) located in the rear part of the tanker aircraft, such as the tail cone of the tanker aircraft, and more particularly in a closed cargo ramp of the tanker. Each light source (5) has a particular distinguishable color tone (although not appreciable in these figures) so that the receiver aircraft is able to identify his position with respect to the tanker aircraft according to the color or colors that the receiver aircraft visualizes.

In this particular example, the first sector (4.1) corresponds to the beam of light from a first light source (5.1) of yellow color tone; the second sector (4.2) corresponds to the beam of light from a second light source (5.2) of dark green color tone; the third sector (4.3) corresponds to the beam of light from a third light source (5.3) of light green color tone; and the fourth sector (4.4) corresponds to the beam of light from a four light source (5.4) of red color tone.

FIGS. 3a to 3c show respectively a particular visual indicator that the receiver aircraft identifies along his vertical displacement relative to the tanker aircraft.

For example, FIG. 3a shows a first visual indicator for the receiver aircraft when it is positioned in the region defined by the overlap of all the sectors (4.1-4.4). In this first region the receiver aircraft is positioned below the optimal region of the refueling operation. FIG. 3b shows a second visual indicator for the receiver aircraft when it is positioned in the region defined by the overlap of the first (4.1) and second (4.2) sectors, this region corresponding also to a not optimal region for the refueling operation. This also happens when the visual indicators corresponds to FIG. 3c wherein the receiver aircraft is positioned in the first sector (4.1). Both FIGS. 3b-3c corresponds to the casuistry in which the receiver aircraft is positioned out of the optimal location, that is, when the receiver aircraft is positioned above this optimal region for the refueling operation.

In this first embodiment, the optimal position so that the receiver aircraft performs the refueling operation, or the disconnection phase, corresponds to the region defined by the overlap of the first (4.1), second (4.2) and third (4.3) sectors.

This former example is for illustrative reasons and actual sectors arrangement may be modified, whether slightly or in major terms, to accommodate to the actual refueling operation.

Figure 8:
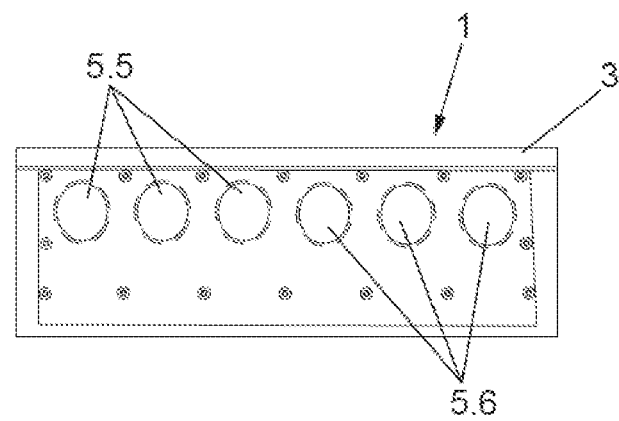
FIG. 8 shows a referencing system of light sources according.

FIG. 8 shows a particular example of a referencing system (1) comprising six light sources (5). In particular, a first plurality of light sources (5.1) provides a beam of light with a red color tone and a second plurality of light sources (5.2) provides a beam of light with a white color tone.

As it will be explained in FIG. 6, each of these light sources of FIG. 8 has a beam amplitude between 2.5 and 3.5° in angle. Further, the projection orientation (αn) of each light source is gradually displaced 2° in angle, pointing out downwards in left side and gradually shifting up to upwards in right side.

Second Embodiment

FIGS. 4 and 5a-5c show a second embodiment of a referencing system (1) wherein the array of references comprises an array of marks (6) and a pointer device (7) that is distanced from the marks (6), particularly the referencing system (1) comprises six marks (6). The distance of the pointer device (7) from the marks (6) can be adjusted based on the expected in-flight refueling conditions and the tanker flight parameters.

The visual intersection between the pointer device (7) and the marks (6) provides distinguishable visual indicators corresponding to sectors for the receiver aircraft. Accordingly, this embodiment is based on perspective.

Figure 4:
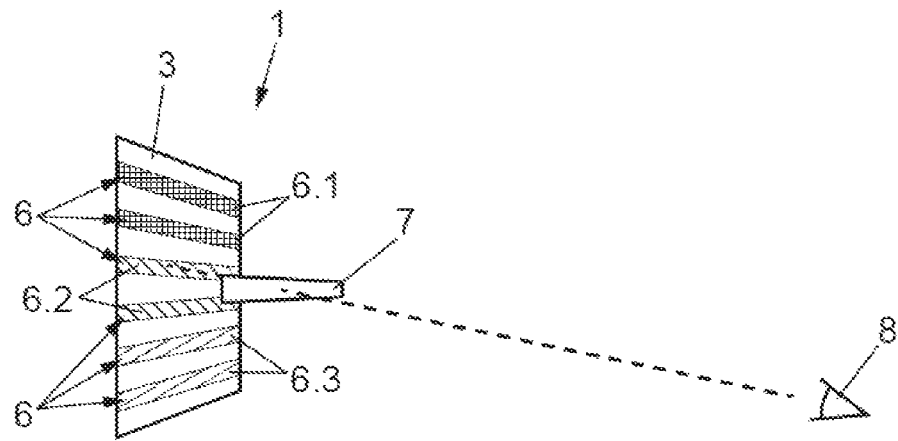
FIG. 4 is a schematic perspective view of a second embodiment of the array of references, formed by an array of n marks and a pointer device, of the present referencing system.
Figures 5A, 5B, 5C:
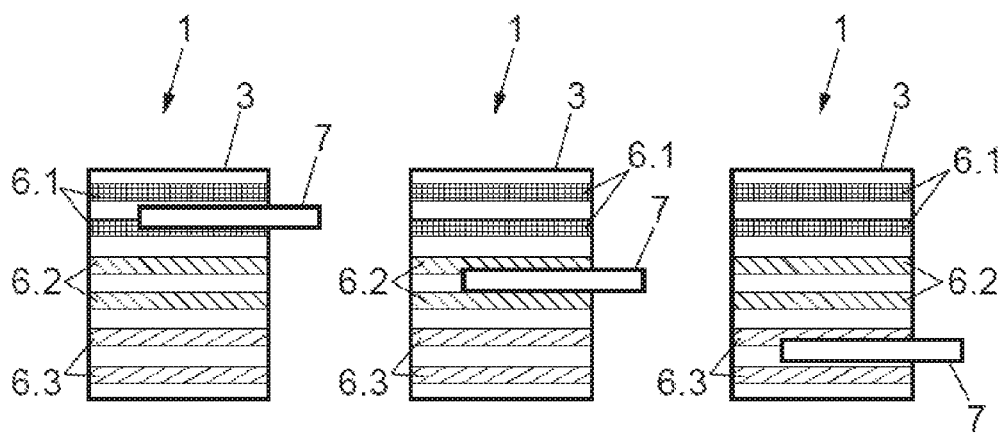
FIGS. 5a to 5c show the congregated array of references within the spot of a referencing system according to the second embodiment, wherein a gradual change of the distinguishable visual indicators is shown as the receiver aircraft moves up or down.

Particularly, FIG. 4 shows the reference point (8) of the receiver aircraft with respect to the referencing system (1) of a tanker aircraft. That is, the receiver aircraft is able to know its position with respect to the tanker aircraft depending on the visual indicator visualized by this receiver aircraft in combination with the marks (6) and the visually intervention of the pointer device (7).

In this second embodiment, the array of six marks (6) are placed on the spot (3) and are stacked horizontal lines of different color tones. In a particular example, these horizontal lines are either LED or Infrared lights.

In a further example, these marks (6: 6.1, 6.2, 6.3) are only visible through night-vision goggles, which need to be wore by the pilot of the receiver aircraft.

That is, from the view point (8) of the pilot of the receiver aircraft when close to the tanker aircraft and looking at the spot (3) where references (6, 7) are congregated, the pointer device (7) (e.g. a horizontal suspended bar) intercedes such vision line. Depending on the relative vertical distance of the receiver aircraft, the pilot shall perceive that the pointer device (7) hides some of the marks (6) stacked on the spot (3).

Therefore, if the pointer device (7) hides any of above marks (6.1) (see FIG. 5a), the pilot acknowledges that he may be flying too low to disconnect. On the other end, if the pilot sees that below marks are hidden (6.3) (see FIG. 5c), he may be flying too high. The middle situation (see FIG. 5b), where intermediate marks (6.2) are hidden by the fixed pointer device (7), may be the suitable one for disconnecting the probe.

Depending on the expected flight and receiver aircraft type to be refueled, the distance and position of the pointer device may be adjusted.

Figure 6:
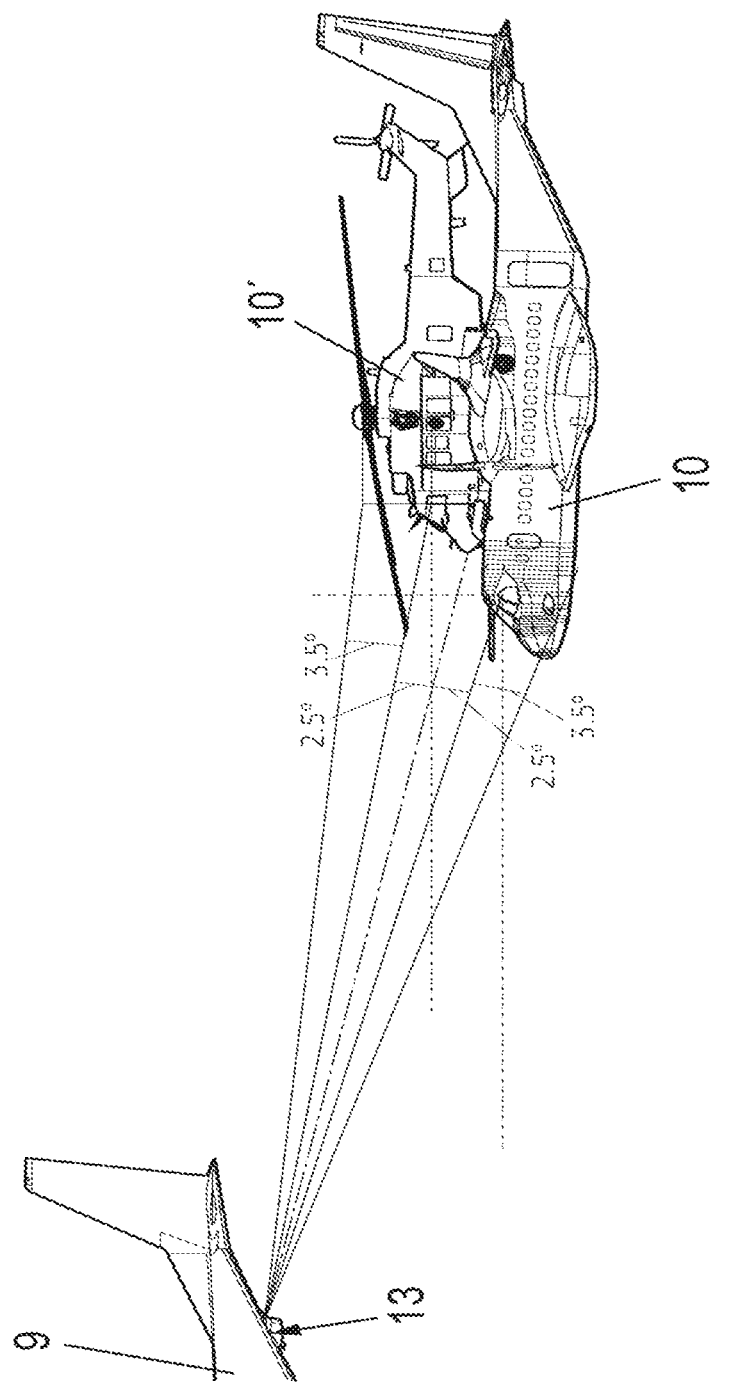
FIG. 6 shows a schematic lateral view of a receiver aircraft close to a tanker aircraft taken as a reference for adjusting the parameters sizing the referencing system from the nominal position of the hose and drogue system according to an embodiment of the present invention.

Regardless the embodiment used, whether first or second, in FIG. 6 it is depicted the nominal position from where the referencing system is sized and adjusted. A C295 tanker aircraft (9) is shown on left side, while two superimposed receiver aircrafts (10) (one being a helicopter) are shown on right side.

One receiver (10), the helicopter, has its probe beneath; while the other aircraft has its probe above the wings. In this representation, both receiver aircrafts (10) are arranged so that the respective probe tip matches.

With this 'general arrangement', and considering that the tanker aircraft (9) is a C295 in the low speed range, the angular range in the X-Z (vertical) plane addresses a scope of 12° in angle (+/−6° around the nominal position with respect to the horizontal one). As mentioned, for this aircraft couple and taking into account in-flight refueling parameters, it is found appropriate to split the 12° into 6 sectors with 2° intervals between adjacent ones.

Once the probe is connected, the aircraft receiver pilot does not need to look up to another condition but when he intends to disconnect the probe should be in the same relative position that it was originally connected (drogue forces equilibrium, i.e. nominal position) so that the drogue does not skid when disconnecting.

Figure 7:
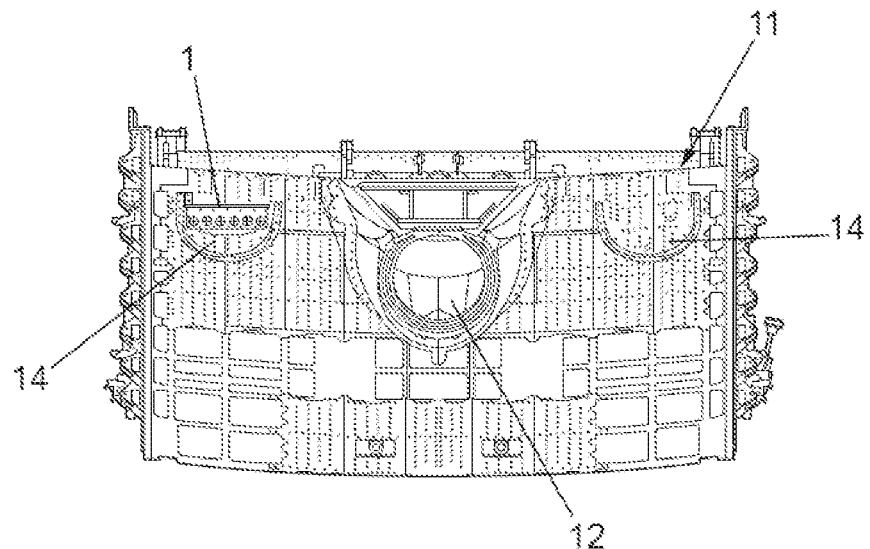
FIG. 7 shows a referencing system located in the rear part of a tanker aircraft according to an embodiment of the present invention.

FIG. 7 depicts a cargo ramp (11) of a tanker aircraft comprising a referencing system (1) according to the present invention. In the middle, it is shown the hose tunnel outlet (12) from where the hose and drogue system is deployed.

In particular, the referencing system (1) forms part of a wider 'Vision & Visual Aids subsystem' in charge of providing the tanker and receiver crews with situational awareness to safely perform the refueling operation.

To achieve this awareness function, the aircraft C295 shown in FIGS. 6 and 7 is equipped in its tail cone (13), preferably in the cargo ramp (11), with dedicated external cameras (14), including a thermal one which will be tested for night operation.

This modified cargo ramp (11) of the tanker aircraft (9) is also configured to provide the receiver aircraft (10) with visual information related to the deployed hose length (X-axis awareness) and related to the relative altitude to the tanker (Z-axis awareness) with a referencing system (1) according to the present invention. To assure their replacement, these dedicated systems may be installed on dedicated fairings of the cargo ramp.

As it was already mentioned, due to the symmetrical hose deployment, no additional aids are necessary for Y-axis awareness.

This C295 cargo ramp platform shown in FIG. 7 is especially dedicated for very low speed receivers, such as medium helicopters, but also for intermediate speed receivers, such as slow fighters (e.g. F-18). At both refueling envelopes, other light transport aircraft may be a suitable receiver.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tanker aircraft comprising:
an inflight refueling system including a hose and drogue;
a referencing system including an array of references congregated on a spot of a rear part of the tanker aircraft,
wherein the array of references defines a plurality of sectors originated from the spot and projecting rearward of the tanker aircraft into airspace, wherein each of the plurality of sectors is defined by a corresponding amplitude in an angle of the sector with respect to the spot;
wherein the array of references of the referencing system comprises an array of lights with n light sources, and n is a natural number greater than or equal to three, and each of the light sources projects a light beam that provides a distinguishable visual indicator and each of the n light sources has a corresponding projection orientation ($\alpha n$), and the array of references is adjustable with respect to the projection orientation ($\alpha n$) for each of the n light sources,
wherein, the array of references provides a distinct visual indicator for each of the sectors, and
wherein the array of references is adjustable with respect to at least one flight parameter of the tanker aircraft, and at least one in-flight refueling operation parameter.

2. The tanker aircraft according to claim 1, wherein the at least one flight parameter of the tanker aircraft includes: tanker aircraft speed and/or tanker aircraft angle of attack.

3. The tanker aircraft according to claim 1, wherein the in-flight refueling operation parameter includes: a type of receiver aircraft to be refueled, a type of the drogue, and/or a length of the hose.

4. The tanker aircraft according to claim 1, wherein at least two of the n light sources project light beams that partially overlap such that the at least two of the n light sources are both visible to a receiver aircraft only within an overlapped region of the sectors corresponding to the at least two of the n light sources.

5. The tanker aircraft according to claim 1, wherein the n light sources are at least three light sources, and each of the at least three light sources emit light in a color tone different than at least one of the other three light sources.

6. The tanker aircraft according to claim 1, wherein each of the sectors has an angular amplitude along a vertical direction in a range of 2 to 4 degrees.

7. The tanker aircraft according to claim 1, wherein the projection orientation ($\alpha n$) of each of the light sources is configured to be incrementally adjusted in angles of two degrees.

8. A tanker aircraft comprising:
an inflight refueling system including a hose deployable from the tanker aircraft;
a referencing system mounted to the tanker aircraft and proximate to an outlet on the tanker aircraft for the hose, wherein the referencing system includes an array of visual references each visible to a receiver pilot of a receiver aircraft approaching the tanker aircraft for refueling;
wherein a first visual reference in the array of visual references is visible to the receiver pilot along a line of sight of the receiver pilot while the receiver aircraft is in a first sector of airspace behind the tanker aircraft;
wherein a second visual reference in the array of visual references is visible to the receiver pilot along the line of sight of the receiver pilot while the receiver aircraft is in a second sector of airspace behind the tanker aircraft, and
wherein the referencing system is adjustable to adjust the first sector orientation with respect to the tanker aircraft and/or adjust the second sector orientation with respect to the tanker aircraft.

9. The tanker aircraft of claim 8, wherein the first visual reference is a first light source projecting a first light beam defining the first sector of airspace, and the second visual reference is a second light source projecting a second light beam defining the second sector of airspace, and the first and second light beams partially overlap.

10. The tanker aircraft of claim 8, wherein the array of visual references comprises an array of n marks arranged along a horizontal direction, wherein n is a natural number of at least three, and the referencing system further comprises:
a pointer device separated from the n marks along a line of site direction extending from the n marks through the pointer device towards the receiver aircraft,
wherein the first visible reference is first mark of the n marks and the first sector is a line of sight extending from the first mark through the pointer towards the receiver aircraft, and
wherein the second visible reference is a second mark of the n marks and the second sector is a line of sight extending from the second mark through the pointer towards the receiver aircraft.

11. The tanker aircraft of claim 10, wherein the referencing system is adjustable by adjusting a distance between the pointer and the array of n marks.

12. A method to assist in relative positioning a receiver aircraft with respect to a tanker aircraft during an in-flight refueling operation, the method including:
adjusting an array of visual references in a referencing system mounted to the tanker aircraft and proximate an outlet for a hose wherein the array of visual references is visible to a receiver pilot of a receiver aircraft approaching the tanker aircraft for refueling,
wherein the adjustment of the referencing system includes adjusting the referencing system such that a first visual reference in the array of visual references will be visible along a line of sight of a receiver pilot while the receiver aircraft is in a first sector of airspace behind the tanker aircraft, and the adjustment moves a relative orientation of the first sector with respect to the tanker aircraft,
wherein the adjustment of the referencing system includes adjusting the referencing system such that a second visual reference in the array of visual references will be visible along the line of sight of a receiver pilot while the receiver aircraft is in a second sector of airspace behind the tanker aircraft, and the adjustment moves a relative orientation of the second sector with respect to the tanker aircraft,
wherein the adjustment of the referencing system includes adjusting the referencing system such that a third visual reference in the array of visual references will be visible along a line of sight of a receiver pilot while the receiver aircraft is in a third sector of airspace behind the tanker aircraft, and the adjustment moves a relative orientation of the third sector with respect to the tanker aircraft, and wherein the adjustment of the referencing system is based on at least one flight parameter of the tanker aircraft and at least one in-flight refueling operation parameter.

13. The method of claim 12, wherein the array of visual references includes at least three light sources, and the adjustment of referencing system is made while the tanker aircraft is on the ground, and the adjustment includes:

adjusting the first light source to project a first light beam in the first sector;

adjusting the second light source to project a second light beam in the second sector; and adjusting the third light source to project a third light beam in the first sector;

wherein the second sector overlaps partially with the first and third sectors, and the first sector does not overlap the third sector.

14. The method of claim 12, wherein the array of visual references includes a horizontal array of light emitting or reflective bars and a pointer device rearward of the reflective bars, and the adjustment of the referencing system includes adjusting the pointer device.

\* \* \* \* \*